(12) United States Patent
Sakai

(10) Patent No.: US 10,387,168 B2
(45) Date of Patent: Aug. 20, 2019

(54) INFORMATION PROCESSING APPARATUS AND LIBRARY MANAGEMENT METHOD

(71) Applicant: CANON KABUSHIKI KAISHA, Tokyo (JP)

(72) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 15/444,555

(22) Filed: Feb. 28, 2017

(65) Prior Publication Data

US 2017/0255480 A1 Sep. 7, 2017

(30) Foreign Application Priority Data

Mar. 3, 2016 (JP) .................................. 2016-041492

(51) Int. Cl.
G06F 9/44 (2018.01)
G06F 9/445 (2018.01)

(52) U.S. Cl.
CPC .................................. G06F 9/44521 (2013.01)

(58) Field of Classification Search
CPC .................................................. G06F 9/44521
USPC .......................................................... 717/162
See application file for complete search history.

(56) References Cited

U.S. PATENT DOCUMENTS

| 7,426,048 | B2  | 9/2008  | Sakai et al.             |
|-----------|-----|---------|--------------------------|
| 7,539,579 | B2* | 5/2009  | Beattie ........... G06F 19/20 |
|           |     |         | 435/6.11                 |
| 9,477,498 | B2* | 10/2016 | Kajigaya ........ G06F 9/44521 |
| 2008/0154897 | A1* | 6/2008  | Meliha .......... G06F 16/258 |
| 2009/0007130 | A1 | 1/2009  | Sakai et al.             |
| 2016/0266933 | A1 | 9/2016  | Sakai                    |
| 2018/0127823 | A1* | 5/2018  | Shekhar ......... G06F 19/20 |

FOREIGN PATENT DOCUMENTS

JP 2005-293084 A 10/2005

OTHER PUBLICATIONS

Unpublished, copending U.S. Appl. No. 15/238,077, filed Aug. 16, 2016, to Katsuya Sakai.

* cited by examiner

Primary Examiner — Evral E Bodden
(74) Attorney, Agent, or Firm — Venable LLP

(57) ABSTRACT

As a portion of processing for activation an apparatus or when an application is installed, a Lib management module determines whether there is a plurality of libraries in a setting of a class path, and, in a case of determining that a plurality of libraries are set, expands the set libraries, and after integrating them as a new library, sets the newly generated library as the class path. In addition, the Lib management module deletes libraries that are included in the library after the integration except for those that are directly accessed.

17 Claims, 17 Drawing Sheets

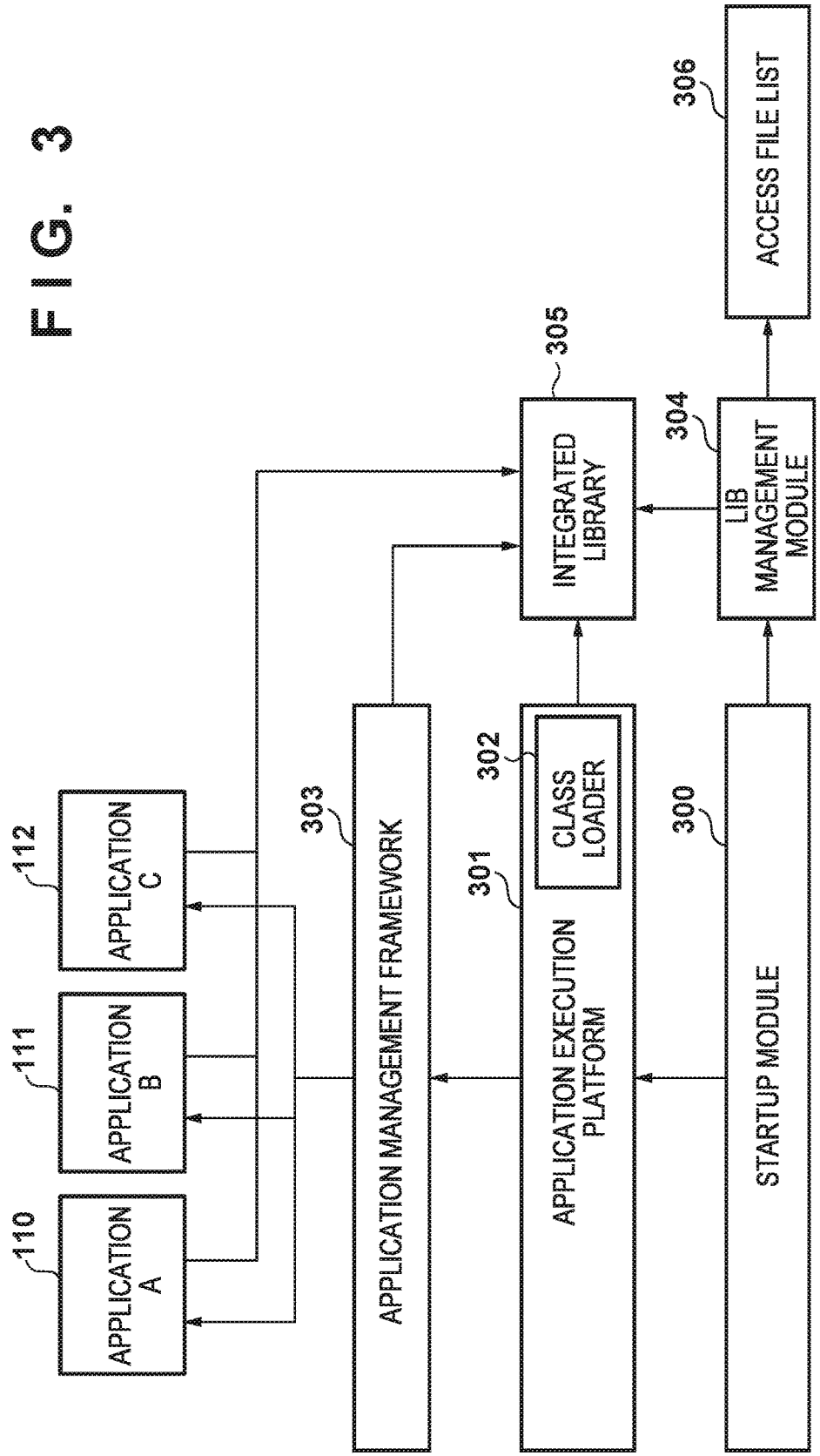

EXEMPLARY STARTUP OPTION CONFIGURATION FILE

401 -Dsun.boot.library.path=/Device/lib
402 -Xbootclasspath/a
403 :/Device/system/lib/libSystem001.jar
:/Device/system/lib/libsystem002.jar
:/Device/system/lib/libsystem003.jar
⋮
404 /service/boot/MainBooter

EXEMPLARY STARTUP OPTION CONFIGURATION FILE

411 -Dsun.boot.library.path=/Device/lib
-Xbootclasspath/a:/Device/system/lib/libinteg.jar
/service/boot/MainBooter

FIG. 5A

11n — EXEMPLARY APPLICATION CONFIGURATION

- APPLICATION EXECUTABLE CODE FILE — 500
- APPLICATION-CONTAINED LIBRARIES — 501
  - libpa1.jar
  - libpa2.jar
  - libpa3.jar
  - libpa4.jar
  - libpa5.jar
- APPLICATION CONFIGURATION FILE — 502

"EXEMPLARY APPLICATION CONFIGURATION FILE"
ApplicationName : PreviewApp —511
ApplicationID : A880-C10F-0002-0142
ApplicationResource : —513
  MAX_Storage : 563877
  MAX_Memory : 546112
  MAX_Thread : 3
  MAX_FileDescriptor : 8
  MAX_Socket : 1      512
ApplicationClassPath —514          515
  :.←RELATIVE PATH OF APPLICATION EXECUTABLE CODE FILE
  :/Device/module/PreviewApp/libpa1.jar
  :/Device/module/PreviewApp/libpa2.jar
  :/Device/module/PreviewApp/libpa3.jar
  :/Device/module/PreviewApp/libpa4.jar
  :/Device/module/PreviewApp/libpa5.jar DirectAccessJarFiles: —516
  /Device/module/PreviewApp/libpa1.jar;
  /Device/system/lib/libsystem002.jar

"EXEMPLARY APPLICATION CONFIGURATION FILE"
ApplicationName : PreviewApp
ApplicationID : A880-C10F-0002-0142
ApplicationResource :
  MAX_Storage : 563877
  MAX_Memory : 546112
  MAX_Thread : 3
  MAX_FileDescriptor : 8
  MAX_Socket : 1        522
ApplicationClassPath —521
  :.

DirectAccessJarFiles:
  /Device/module/PreviewApp/libpa1.jar;
  /Device/system/lib/libsytem002.jar

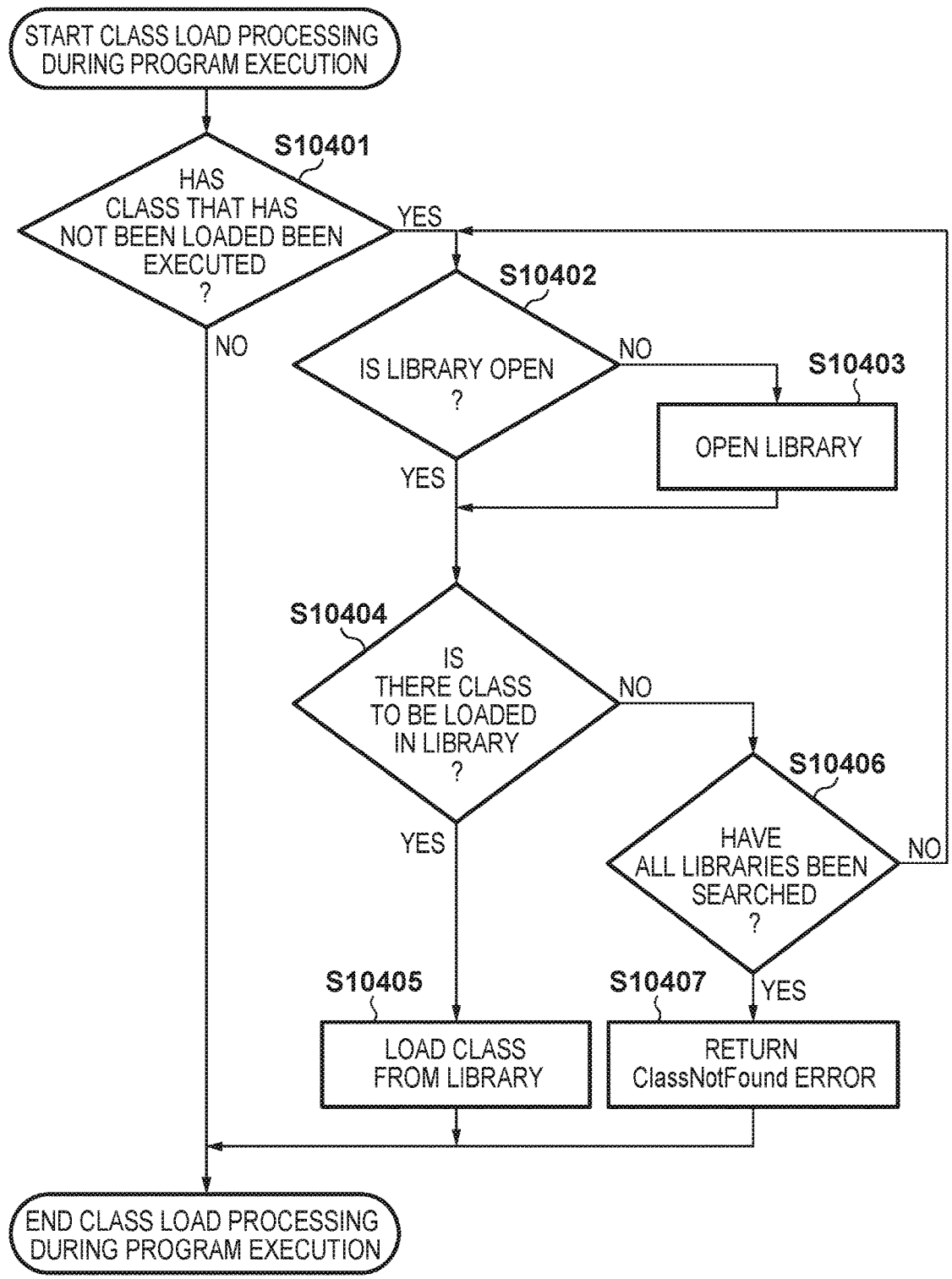

EXEMPLARY OPTION CONFIGURATION FILE

-Dsun.boot.library.path=/Device/lib
-Xbootclasspath/a:/Device/system/lib/libinteg.jar
1101 — :/Device/system/lib/libsystem001.jar
:/Device/system/lib/libsystem002.jar
/service/boot/MainBooter

"EXEMPLARY APPLICATION CONFIGURATION FILE"

ApplicationName : PreviewApp
ApplicationID : A880-C10F-0002-0142
ApplicationResource :
  MAX_Storage : 563877
  MAX_Memory : 546112
  MAX_Thread : 3
  MAX_FileDescriptor : 8
  MAX_Socket : 1
ApplicationClassPath   1201

:
:/Device/module/PreviewApp/libpa1.jar

DirectAccessJarFiles:
  /Device/module/PreviewApp/libpa1.jar;
  /Device/system/lib/libsystem002.jar F I G. 14
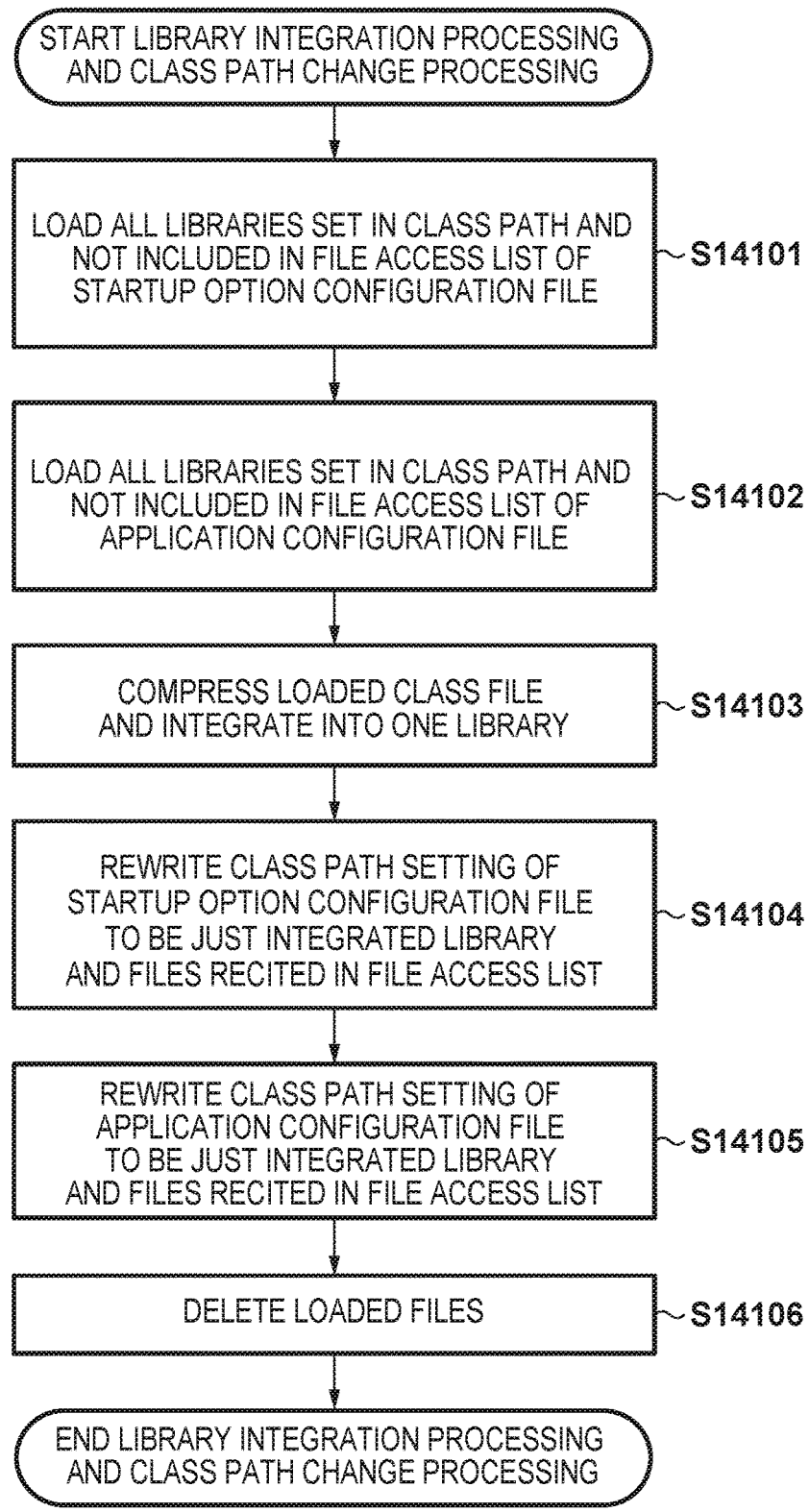

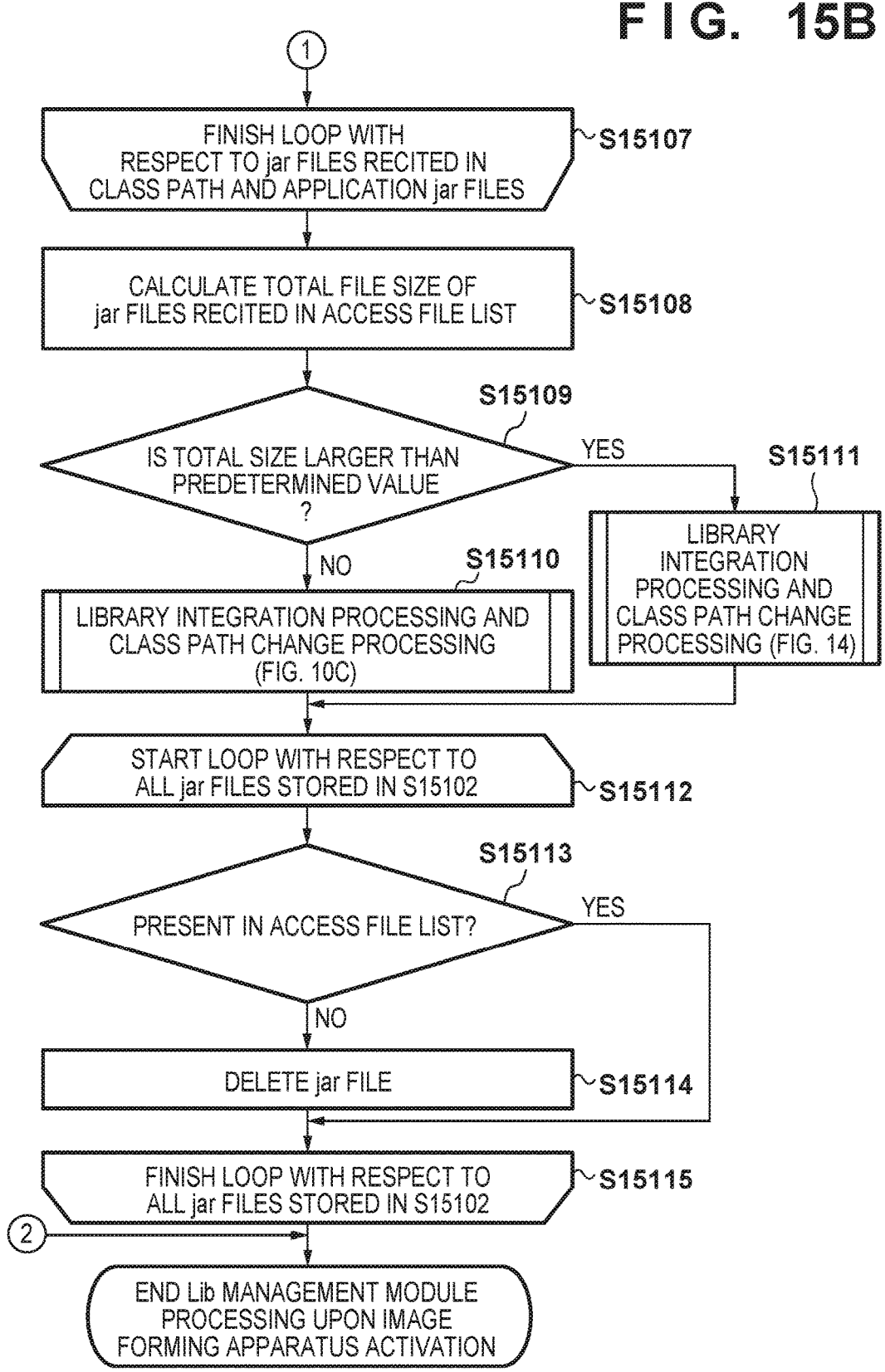

INFORMATION PROCESSING APPARATUS AND LIBRARY MANAGEMENT METHOD

BACKGROUND OF THE INVENTION

Field of the Invention

The present invention relates to an information processing apparatus for managing a library set in a class path, and a library management method.

Description of the Related Art

In a Java (registered trademark) execution environment, loading of a class (necessary code for execution) is performed by a class loader. A class is defined by a class file that is in a library having a JAR (Java Archive) format. Libraries are configured from class files of a plurality of classes, and are often separated by specific functions. Note that a path indicating a location at which a library is present is referred to as a class path, which needs to be set in advance in the Java (registered trademark) execution environment. This is to allow the class loader, when loading classes, to search for a class to load from a library set in the class path. Here, the class loader consumes a file descriptor to search for a class by referencing the library. In a Java (registered trademark) execution environment, to cause performance to improve or to prevent a reference to a library from breaking and operation becoming unstable, a library that is referenced once is referenced until a program that operates in the execution environment terminates. Therefore, a file descriptor consumed by the class loader to reference a library continues to be consumed until the program terminates.

In an embedded device, there are limitations on usable resources in an information processing apparatus that is an application execution environment. A file descriptor is a type of a resource, and there is a restriction on the number of usable file descriptors. Therefore, the following is performed. Firstly, a developer determines an upper limit value for a resource amount that an application uses. When a user administrator starts an application, an application management framework, based on the upper limit value, confirms that a usable resource amount of the information processing apparatus is not exceeded.

As a conventional technique, there is a technique that detects a class that is not being used at all, and deletes from the class path a library having classes that are not being used (for example, Japanese Patent Laid-Open No. 2005-293084).

Japanese Patent Laid-Open No. 2005-293084 leaves unchanged in the class path libraries for which classes are used. That is, if there are a large number of libraries from the class path for which classes are used, many file descriptors are consumed. Accordingly, if the number of usable file descriptors is exceeded, as a result there is an effect on processing for activation. In particular, if an increase of libraries overlaps due to a function enhancement or a software update, a number of file descriptors consumed increases.

SUMMARY OF THE INVENTION

Accordingly, the present application invention suppresses consumption of file descriptors even if a number of libraries used increases.

The present invention has the following configuration.

According to an aspect of the present invention, there is provided an information processing apparatus, comprising: a loading unit configured to, when an installed program is executed, open a library that contains a class used by the program and load the class, the loading unit consuming resources of an amount in accordance with a number of opened libraries; a determination unit configured to determine whether if a number of libraries that include a class set for the installed program is plural; an integration unit configured to integrate classes included in the libraries in a number of integrated libraries that is fewer than the number of libraries if it is determined that the number of libraries is plural; and a deletion unit configured to delete the pre-integration libraries that include the classes included in the integrated libraries excluding libraries that are accessed without going through the loading unit.

According to another aspect of the present invention, there is provided a library management method for an information processing apparatus having loading unit for, when an installed program is executed, opening a library that includes a class used by the program and loading the class, the loading unit consuming resources of an amount that is in accordance with a number of opened libraries, the method comprising: determining whether if a number of libraries that include a class set for the installed program is plural; integrating classes included in the libraries in a number of integrated libraries that is fewer than the number of libraries if it is determined that the number of libraries is plural; and deleting the pre-integration libraries that include the classes included in the integrated libraries excluding libraries that are accessed without going through the loading unit.

By virtue of the present invention, it is possible to reduce a number of file descriptors consumed when loading classes, and it is possible to mitigate a problem of file descriptors that accompanies an increase of library files. In addition, even when there is a module for directly accessing a library file, it is possible to perform operation without problems, and it is possible to achieve a reduction of a usage amount of storage.

Further features of the present invention will become apparent from the following description of exemplary embodiments with reference to the attached drawings.

BRIEF DESCRIPTION OF THE DRAWINGS

FIG. 3 is a configuration diagram of an application execution environment in an image forming apparatus in the first embodiment.

FIG. 4A and FIG. 4B are configuration diagrams of startup option configuration files in the first embodiment.

FIG. 5A, FIG. 5B, and FIG. 5C are configuration diagrams of application configuration files in the first embodiment.

FIG. 10D is a flowchart illustrating a flow of processing of an image forming apparatus in the first embodiment.

FIG. 11 is a configuration diagram of a startup option configuration file in a second embodiment.

FIG. 12 is a configuration diagram of an application configuration file in a second embodiment.

FIG. 14 is a flowchart illustrating a flow of processing of an image forming apparatus in the second embodiment.

FIGS. 15A and 15B show a flowchart illustrating a flow of processing of an image forming apparatus in a third embodiment.

DESCRIPTION OF THE EMBODIMENTS

Hereinafter, embodiments for working the present invention are explained using drawings.

First Embodiment

Figure 1:
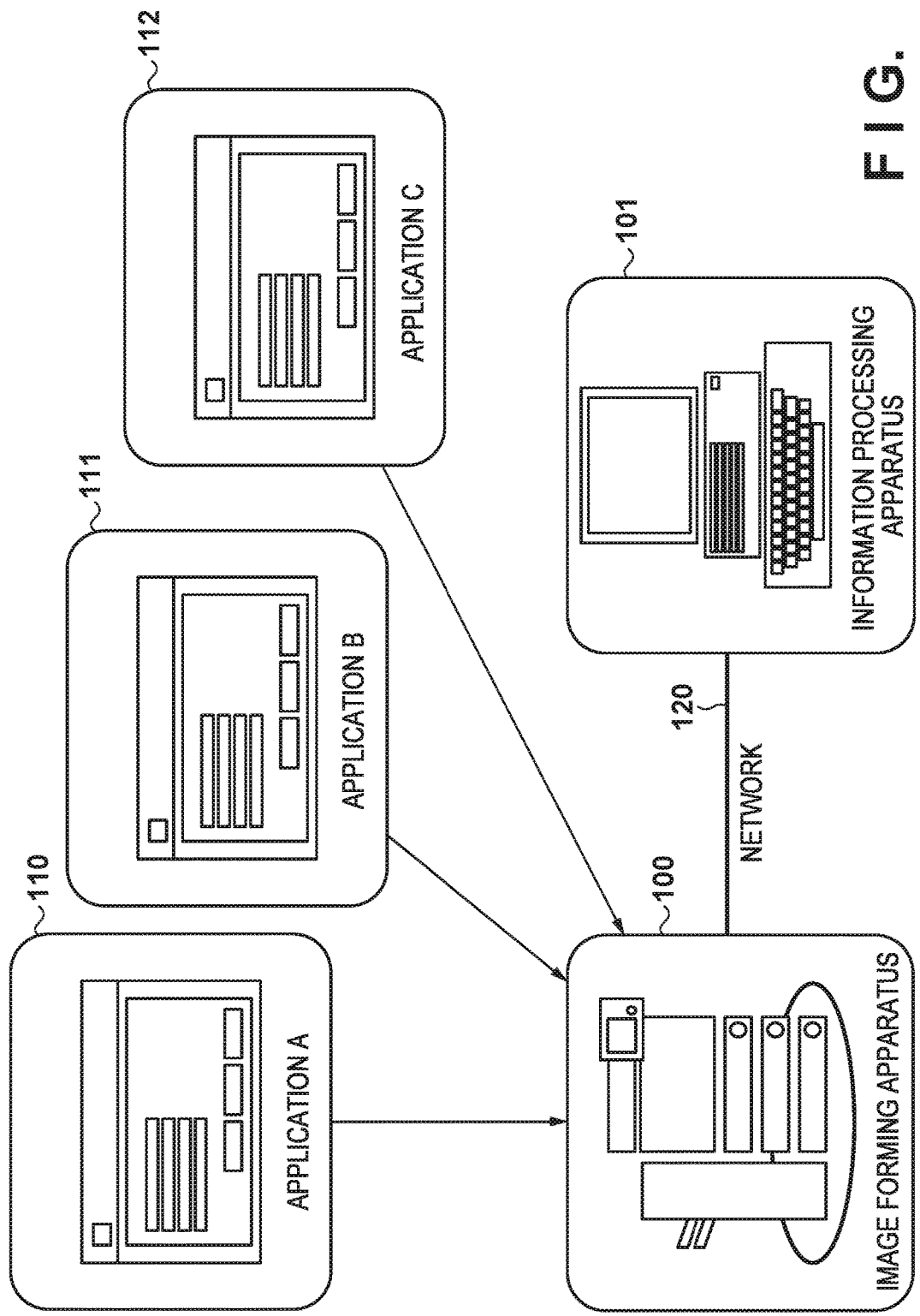
FIG. 1 is a configuration diagram of an image forming apparatus in a first embodiment.

Depicted in FIG. 1 is a view illustrating a configuration of a system of the first embodiment of the present invention as a whole.

An image forming apparatus 100 is an example of an information processing apparatus that implements the present embodiment, and is a multifunction peripheral (MFP), for example. An information processing apparatus 101 manages the image forming apparatus 100. A network 120 connects the image forming apparatus 100 and the information processing apparatus 101. The information processing apparatus 101 is used by usage of the image forming apparatus 100 via the network 120. An application A 110 is one example of an application that operates on the image forming apparatus 100. An application B 111 similarly is another example of an application that operates on the image forming apparatus 100. Furthermore, an application C 112 similarly is yet another example of an application that operates on the image forming apparatus 100. It is possible to cause operation of one or a plurality of applications on the image forming apparatus 100. Here, three applications are exemplified. Hereinafter, an expression of "application 11n", indicates one or a plurality of applications represented by the application A 110, the application B 111, and the application C 112. A general user and an administrator can use a basic function of the image forming apparatus 100, the application 11n, and a resource management apparatus for managing the image forming apparatus 100 and the application 11n. Regarding usage, directly operating the image forming apparatus 100 and operating the image forming apparatus 100 from the information processing apparatus 101 via the network 120 are possible.

<Hardware Configuration of Image Forming Apparatus>

Figure 2:
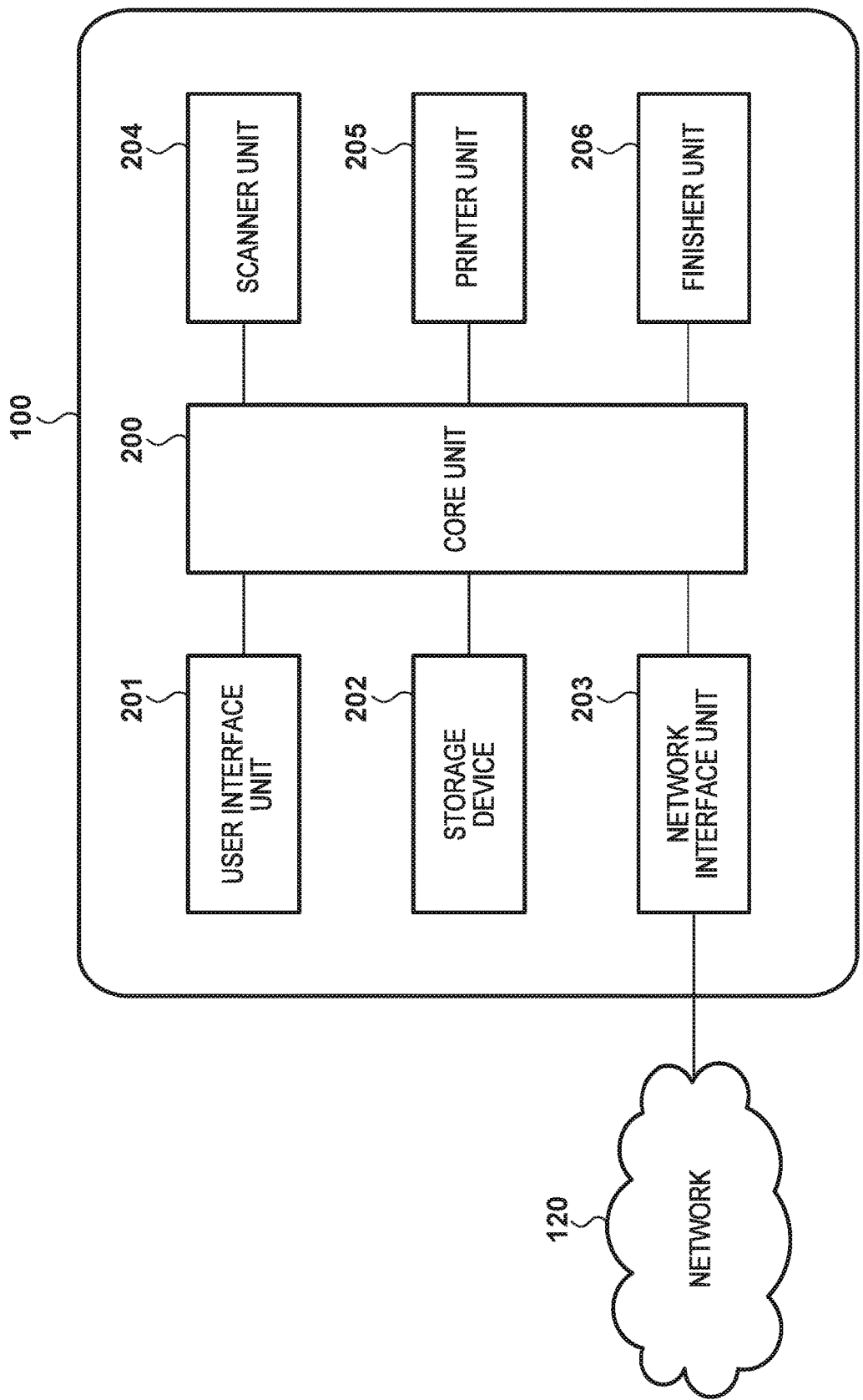
FIG. 2 is a hardware configuration diagram of the image forming apparatus in the first embodiment.

FIG. 2 schematize a hardware configuration of the image forming apparatus 100.

A core unit 200 is a control unit that includes a processor, a memory, or the like, and controls various devices connected to the core unit 200 by the processor and the memory working together to execute a program. In addition, it realize an application execution environment, and executes an installed application. A user interface unit 201, a storage device 202, a network interface unit 203 for connecting to the network 120, a scanner unit 204, a printer unit 205, a finisher unit 206, or the like are connected to the core unit 200 as peripheral devices. The core unit 200 controls these devices, provides their functions to a user via the network 120 or the user interface unit 201, and also provides their functions to an application.

<Application Execution Environment>

FIG. 3 depicts an application execution environment for executing an application 11n on the image forming apparatus 100 in the present embodiment.

A startup module 300 is a module for starting-up the application execution environment. When a user turns a power supply of the image forming apparatus 100 on, the system starts operating, and the startup module 300 makes an instruction for generation processing for an integrated library, which is processing for the present embodiment, to a Lib management module 304. The Lib management module 304 is a module for working the present embodiment, and is a module for regenerating libraries set in the class path to one integrated library. After generation processing of the integrated library finishes, the startup module 300 activates an application execution platform 301. The application execution platform 301 is a Java (registered trademark) execution environment, and is a Java (registered trademark) VM (virtual machine), for example. A class loader 302 is a module for loading a class. The application is executed by a system program, and when a class is used therein, the class is dynamically loaded by the class loader 302 from a library that includes the class that is specified by the class path.

If execution processing of a class that has not been loaded is instructed, the class loader 302 searches for the class, for which execution processing is instructed, from libraries set in the class path. The class is executable code for the application execution platform 301 to execute an instruction, and the class path is information of a path that indicates the location of a library in which the class is included. In the class path there is a first class path that includes classes necessary for the system, and a second class path that includes classes for each application 11n. Although a system is an operating system in the narrow sense, in the present example, it indicates software modules, which includes an operating system, other than an application. The first class path is a path necessary to load system classes, and includes each of a boot class path and a system class path, or is a class path that includes at least one of these. The boot class path is a path that indicates the location of a library that includes classes necessary to activate the Java (registered trademark) execution environment. The system class path is a path that indicates a location of a library that includes classes necessary to activate the application execution platform 301 and an application management framework 303. The second class path is an application class path (or app class path) that indicates the location of libraries that include classes of an application. When the startup module 300 activate the application execution platform 301, the first class path is passed as a startup option to the application execution platform 301. The application execution platform 301 registers the passed first class path. The second class path is a class path (an application class path 514 indicated in FIG. 5B) that the application management framework 303 reads from an application configuration file (for example an application configuration file 502 indicated in FIG. 5A) included in an application, and the application management framework 303 sets the read class path as the second class path for just the application to be started. Therefore, despite the name of the second class path, the second class path is a completely different class path for each different application 11n.

In the present example, the application configuration file is a Java (registered trademark) manifest file, for example.

The class loader 302 searches for a class from a library set in the class path, and if a search target class is found in the libraries, the class loader 302 loads the class from the library. The application execution platform 301 then executes the loaded class. If a target class is not found, a user is warned via a user interface unit 201 such as a browser screen or a console screen that the class was not found. From when the system of the image forming apparatus 100 starts operating until the power supply of the image forming apparatus 100 is turned off by a user, if a class that is not loaded is to be executed, such class load processing by the class loader 302 is performed. In addition, a name space is provided in advance by a developer to a class so that classes with the same name do not conflict. A library is a JAR (Java Archive) file in which one or more classes are compressed. To prevent classes from conflicting in a library, it is typical for a directory hierarchy corresponding to the name space to be configured in the JAR file, and class files to be arranged therein. In the present embodiment, explanation is given using an example in which configuration by a name space directory hierarchy is made in a library.

The application management framework 303 is a framework for managing installation, uninstallation, execution, and stopping of an application 11n, and is OSGi or the like for example. The application management framework 303 is used to install and execute the application 11n in the application execution environment. By an administrator making a request to the application management framework 303 to install and start the application 11n, the application management framework 303 performs an application install process and application start processing. At that time the application management framework 303 refers to the application configuration file of the application (for example, an application configuration file 502 indicated in FIG. 5A), and determines whether a resource upper limit value declared there (for example a resource upper limit value 513 of FIG. 5B) fits in current available space of the resource in the application execution environment. If it does not fit, starting of the application is caused to fail.

Following is an explanation of a special configuration element for implementing the present embodiment.

The Lib management module 304 is a module for generating an integrated library 305. The Lib management module 304 is instructed with integrated library generation processing from the startup module 300. The Lib management module 304 expands (or decompresses) all libraries set in the first class path (for example a class path 402 of FIG. 4A) of the startup option configuration file (for example a startup option configuration file 400 of FIG. 4A), and all libraries set in the second class path (for example a class path 514 of FIG. 5B) of the application configuration file (for example the application configuration file 502 of FIG. 5A). The expanded classes are re-compressed in the JAR file format as a new integrated library. After the integrated library is created, the Lib management module 304 changes the configuration of the first class path (for example the class path 402 of FIG. 4A) that is in the startup option configuration file (for example the startup option configuration file 400 of FIG. 4A) to be only the newly generated integrated library. In addition the Lib management module 304 deletes the recitation of all libraries set in the second class path (for example the class path 514 of FIG. 5B) of the application configuration file (for example the application configuration file 502 of FIG. 5A). Only the integrated library that collects a class group in a plurality of libraries set as the first class path or the second class path is set to the first class path, and the class loader 302 can search for a required class by just viewing the integrated library.

In addition, the Lib management module 304 specifies a file for direct access without passing through the class loader 302 for each library from a library configuration file 601 or the application configuration file 502 present among pre-integration libraries. The specified file is registered in an access file list 306. In addition, the Lib management module 304 deletes library files not registered in the access file list 306 after the integrated library is generated. By this, disk space is economized because unnecessary files are deleted, and correct operation is achieved even if file access is performed without going through the class loader 302. Note that in a case where a library is directly accessed without using the class loader 302, a file descriptor is not consumed.

The integrated library 305 is a library that is loaded by the class loader 302, and includes the integrated library created by the Lib management module 304. As mentioned previously, the integrated library is a library that compresses a class group of a plurality of libraries set in the first class path or the second class path, by the JAR file format. When a class included in the integrated library is loaded by the class loader once, it can be executed from the application execution platform 301, the application management framework 303, and the application 11n.

The access file list 306 is a table for managing files that have been directly accessed without going through the class loader 302, and updating of details thereof is performed by the Lib management module 304.

<Example of Startup Option Configuration File>

FIG. 4A and FIG. 4B are views for explaining detail of representative files that recite startup option configurations in the present embodiment.

FIG. 4A is a view that illustrates the startup option configuration file 400 before it is changed by the Lib management module 304 in the present embodiment. The startup option configuration file 400 is an startup option configuration file before the Lib management module 304 generates an integrated library and changes the details of the file. A path 401 is location information indicating the location of an executable file for activating the application execution platform 301. A path 402 is location information indicating the location of libraries, and corresponds to the first class path. Libraries 403 is location information of each library set in the first class path. The libraries 403 set in the first class path 402 include a class group necessary for the application execution platform 301 and the application management framework 303 to execute processing. A main program 404 is location information of a main program necessary to activate the application management framework 303 by the application execution platform 301.

FIG. 4B is a view that illustrates a startup option configuration file 410 after it is changed by the Lib management module 304 in the present embodiment. The startup option configuration file 410 is an startup option configuration file after the Lib management module 304 generates an integrated library and changes the details of the file. The startup option configuration file 410 is obtained by changing the startup option configuration file 400, for example. The startup module 300 reads the detail of the startup option configuration file 410, and uses the read detail as an startup option of the application execution platform 301. An integrated library 411 is location information of an integrated library set in the first class path. After generating the integrated library, the Lib management module 304 adds a path of the integrated library to a class path setting of the startup option configuration file 400, and deletes paths of libraries other than the integrated library from the first class path 402.

<Example of Application File>

FIG. 5A is a view for explaining detail of representative files that configure an application 11*n* in the present embodiment. The application 11*n* has several types of files. An application executable code file 500 is a file that includes, for example, executable code of an application. Application-contained libraries 501 are libraries required to execute processing of the application. In execution of processing of an application 11*n*, if a specific class is deficient in the libraries 403 set in the first class path 402 and a function cannot be realized, a developer prepares libraries for the application as application-contained libraries 501. The application configuration file 502 is a file in which basic information such as an application ID, an upper limit value of a resource used by the application, and the second class path are recited. The application configuration file 502 is defined in advance by a developer, and is included in the application 11*n* together with the application executable code file 500 and the application-contained libraries 501.

FIG. 5B is a view illustrating an example of items recited in the application configuration file 502 before the recitation of the libraries set in a second class path 514 is deleted by the Lib management module 304. An application name 511 is a name of the application 11*n*. The application name 511 is displayed by the user interface unit 201 of the image forming apparatus 100 or the like. An application ID 512 is identification information added for the application management framework 303 to uniquely identify each application 11*n*. The resource upper limit value 513 is an upper limit value of a resource used by an application 11*n*. The resource upper limit value 513 is defined for each resource. A developer measures in advance an upper limit value of a resource that can be used by the application 11*n*, and declares it in the application configuration file 502 as the resource upper limit value 513. The application management framework 303 refers to the resource upper limit value 513 when installing and starting the application 11*n*. It then determines whether the application fits in the current available space of the resource in the application execution environment, starts the application if it does fit, and causes the starting of the application 11*n* to fail if it does not fit. The second class path 514 is information to indicate a location of the application-contained libraries 501 or the application executable code file 500 that is necessary when executing processing of the application 11*n*. A path 515 is information of a location of the application-contained libraries 501 or the application executable code file 500 that is set in the second class path.

A direct access file setting 516 is information of the location of a library file that the application performs direct access to, and the Lib management module 304 is used to manage the library file that is directly accessed without going through the class loader 302. When handling a file in a library by going through the class loader 302, because a file that is read out depends on a class path search order, there is the possibility that an unintended file is read out if a file with the same name is included in a plurality of libraries. Accordingly, in a case of desiring to read out a file that is certainly intended, the application may access a file directly without going through the class loader 302. The direct access file setting 516 is prepared to manage such files.

In FIG. 5B, in order to simplify the explanation, although the path of the application executable code file 500 is set by a relative path, it may be recited by an absolute path. In addition, typically the application-contained libraries 501 are libraries not set in the first class path 402, so there is a need to indicate their location as the second class path 514.

FIG. 5C is a view illustrating an example of items recited in the application configuration file 502 after the recitation of the libraries set in the second class path 514 is deleted by the Lib management module 304. When the startup module 300 makes an instruction to the Lib management module 304 for generation processing of the integrated library, the Lib management module 304 refers to the second class path 514 of the application configuration file 502. The application-contained libraries 501 set there are expanded and the libraries set in the first class path 402 and the classes in the application-contained libraries are re-compressed as the integrated library in the JAR file format. Subsequently, the Lib management module 304 changes the first class path 402 to be only the newly generated integrated library. A first class path 411 is obtained by the change. The Lib management module 304 deletes the recitation of the libraries set in the second class path 514 of the application configuration file 502. An application configuration file 520 is the application configuration file after the recitation of the libraries set in the second class path 514 is deleted. A second class path 521 is set to only the path of the application executable code file 500. A path 522 is location information of the application executable code file 500 that is set in the second class path. Because libraries set by the path 515 are set to the first class path 411 of the startup option configuration file as the integrated library 305 by the Lib management module 304, the Lib management module 304 deletes the setting of the libraries from the application configuration file. Note that, in the present embodiment, the startup option configuration file and the application configuration file are referred to together as configuration files.

<Example of Library Arrangement>

Figure 6A:
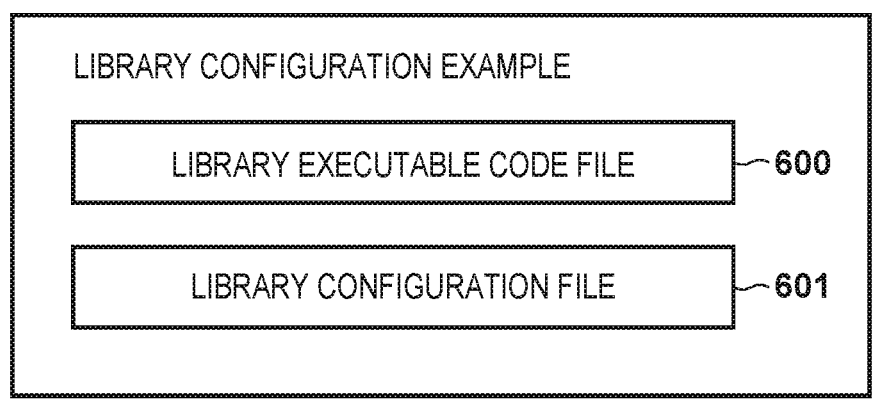
FIG. 6A and FIG. 6B are configuration diagrams of library configuration files in the first embodiment.

FIG. 6A is a view for explaining detail of representative files that configure a library before integration in the present embodiment. A library has several types of files. A library executable code file 600 is a file that includes, for example, executable code of a library. The library configuration file 601 is a file in which a library name and file information that is directly accessed is recited. The library configuration file 601 is defined (generated) in advance by a developer, and included in a library together with the library executable code file 600.

Figure 6B:
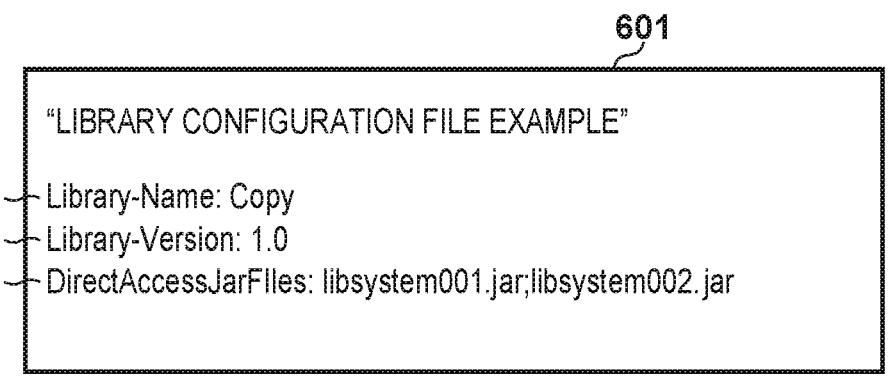

FIG. 6B is an example of the library configuration file 601. A library name 611 is the name of the library. A library version 612 is the version of the library. The library name 611 and the library version 612 are used, for example, when displaying a version on an operation unit. A direct access file setting 613 is information of the location of libraries that the library directly accesses. The direct access file setting 613 is referenced by the Lib management module 304, and is used as information for managing libraries that are directly accessed. In this example of a configuration file, that version 1.0 of a Copy library directly accesses two files, libsystem001.jar and libsystem002.jar, is illustrated.

<Example of Access File List>

Figures 7, 8:
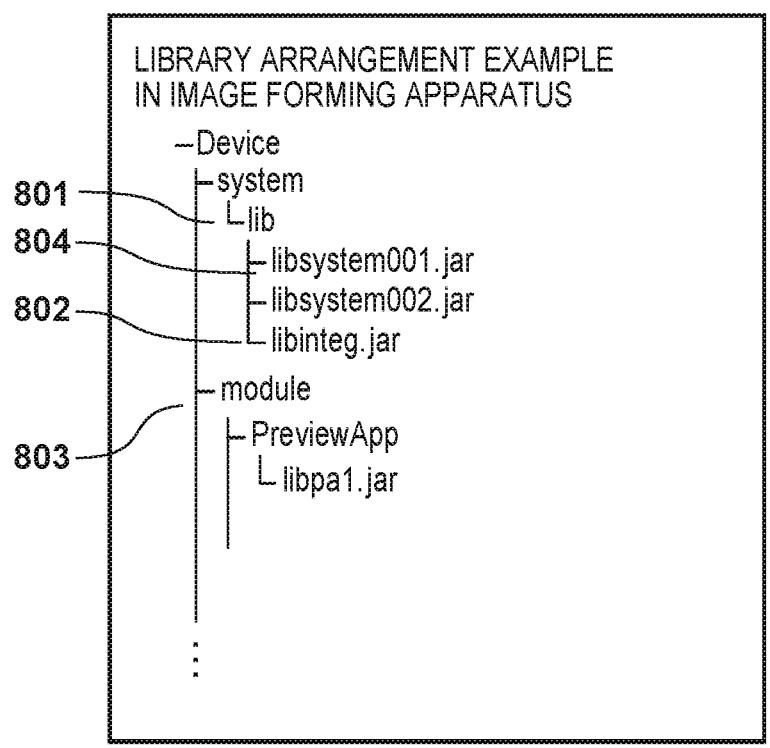
FIG. 7 is an example of an access file list in the first embodiment.
FIG. 8 illustrates a library arrangement in an image forming apparatus 100 in the first embodiment.

FIG. 7 is a view that illustrates an example of the access file list 306 that is managed by the Lib management module 304. The access file list 306 is configured from paths of files that are directly accessed. When performing library integration processing, the Lib management module 304 obtains information from location information of files for which direct access is performed that is recited in the application configuration file 502 or the library configuration file, to generate the access file list 306. The location information includes the direct access file setting 516 that indicates the location of a direct access file in accordance with the application, and the direct access file setting 613 that indicates the location of a direct access file in accordance with a library. In addition, when deleting library files after the library integration, the Lib management module 304 controls so as to not delete files registered in the access file list 306.

<Example of Library Arrangement>

FIG. 8 is a configuration diagram that illustrates in a tree shape an example of a library arrangement in the image forming apparatus 100. A folder 801 is a folder for arranging libraries set in the first class path 402. An integrated library 802 generated by the Lib management module 304 and libraries 804 that are directly accessed are arranged in the folder 801. The libraries 804 that may be directly accessed are managed by the access file list 306. Libraries that are not directly accessed (excluding however the integrated library) are deleted after the library integration to economize storage capacity. The integrated library 802 is a library generated by the Lib management module 304. After generating the integrated library 802, the Lib management module 304 sets this library 802 to the first class path 411. A folder 803 is a folder for arranging an application 11n installed in the image forming apparatus 100. When the application 11n is installed, the application management framework 303 extracts the application-contained libraries 501 from the application 11n, and arranges it in a folder for application storage 803. Subsequently, libraries are integrated by the Lib management module 304 when the image forming apparatus is activated. At that time, libraries other than those that are directly accessed are deleted. In the case of the application configuration file 502 which is illustrated by FIG. 5A, only libpa1.jar which is file that is directly accessed is arranged.

<Example of Arrangement of Class Files>

Figure 9A:
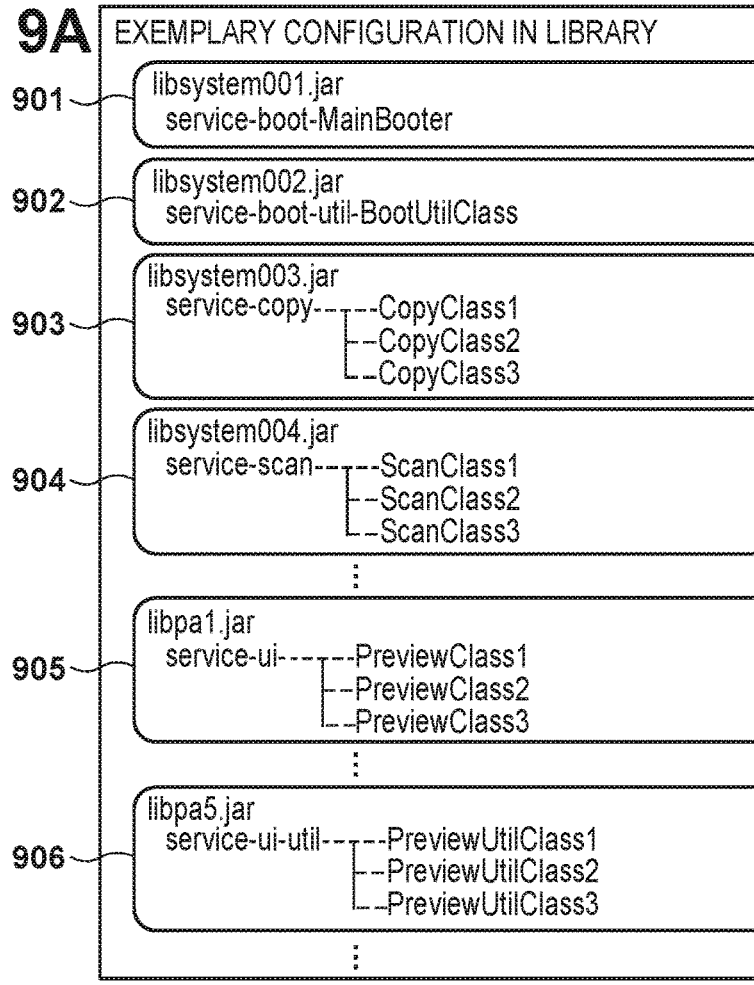
FIG. 9A and FIG. 9B are views illustrating arrangements of class files in a library in the first embodiment.
Figure 9B:
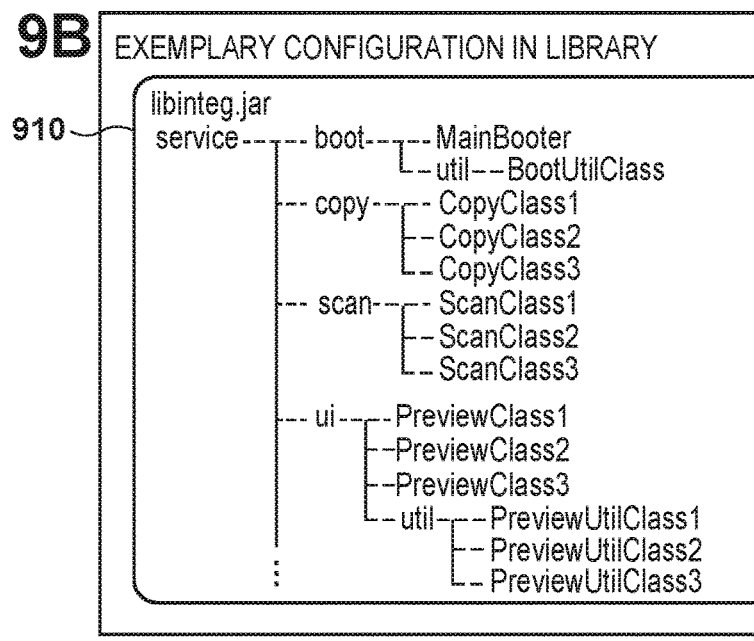

FIG. 9A and FIG. 9B are configuration diagrams that illustrate, by tree shapes, examples of arrangement of class files in libraries of the present embodiment.

FIG. 9A is a view that illustrates the inside of libraries that are expanded for the Lib management module 304 to gather and compresses class files. The libraries 901 to 904 are libraries set in the first class path 402, and class files included therein and the arrangement thereof are illustrated. The libraries 905 to 906 are libraries set in the second class path 514, and class files included therein and the arrangement thereof is illustrated.

FIG. 9B is a view that illustrates an internal structure of an integrated library generated after the Lib management module 304 expands the libraries and compresses all of the class files. A library 910 is an integrated library set in the first class path 411, and class files included therein and the arrangement thereof is illustrated. Because the class files recited in FIG. 9A are all arranged in the integrated library, the class loader 301 can find a class required for execution of processing by just searching for the class from this integrated library. By this, it is possible to reduce the number of libraries to open, and it is possible to suppress the number of file descriptors used.

<Application-Related Processing by Image Forming Apparatus>

Figure 10A:
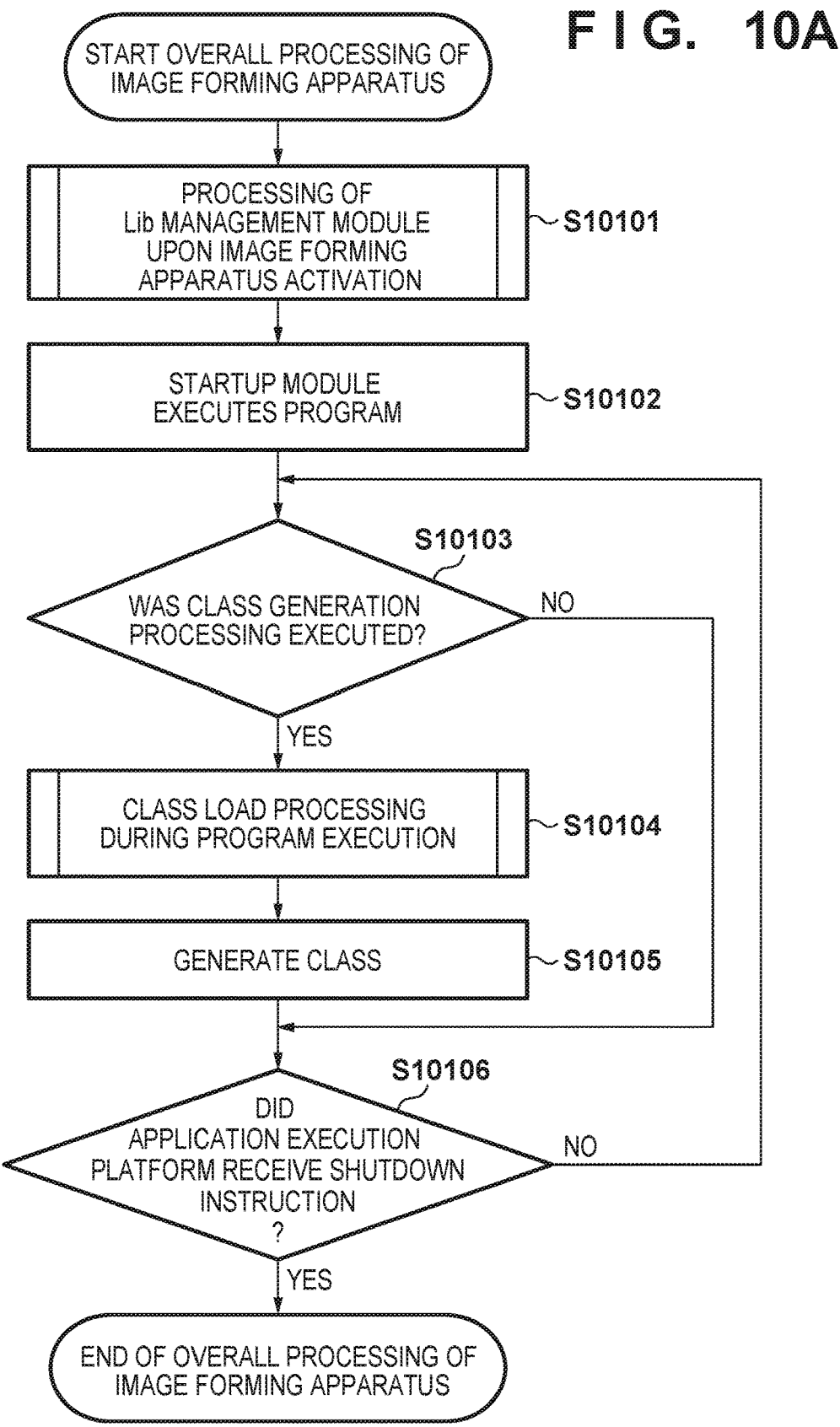
FIG. 10A is a flowchart illustrating a flow of processing of an image forming apparatus in the first embodiment.

FIG. 10A is a flowchart in the present embodiment that schematically represents a flow of processing from when a user turns the power supply of the image forming apparatus 100 on until the power supply is turned off. The procedure of FIG. 10A is executed by the core unit 200, in particular by the processor included in the core unit 200. This procedure is started by the operating system, for example, and operates by the software modules performing each step. Although software is described as the agent in the following explanation, the software is a virtual processing agent, and the actual entity is the processor or the processor core that executes the software.

When a user turns a power supply of the image forming apparatus 100 on, the operating system starts operating, firstly the startup module 300 activates, and in step S10101 the startup module 300 makes an instruction for integrated library generation processing to the Lib management module 304. This processing is explained with reference to FIG. 10B. When the Lib management module 304 completes the integrated library generation processing, in step S10102 the startup module 300 activates the application execution platform 301 with the details of the startup option configuration file 410 as a startup option. When the application execution platform 301 is activated, processing of a main program 404 is executed and the processing advances. The class loader 302, which is a portion of the application execution platform 301, monitors class loading. In step S10103, the class loader 302 determines whether a class has been loaded at a time of class generation. In step S10103, when the class loader 302 determines that the application execution platform 301, the application management framework 303, or the application 11n execute class generation processing during execution of the main program, processing proceeds to step S10104, and if execution was not performed, the processing proceeds to step S10106. In step S10104, the class loader 302 performs class load processing. When class load processing terminates, in step S10105 the application execution platform 301, the application management framework 303, or the application 11n generates a class, and processing proceeds to step S10106. In step S10106, after the activation of the main program, the application execution platform 301 determines whether the power supply of the image forming apparatus 100 has been turned off by a user, based on a notification or the like from the operating system, for example. If it is determined that the power supply has been turned off, the application execution platform 301 performs processing for cutting the power supply of the image forming apparatus 100, and the system of the image forming apparatus 100 terminates. If the power supply is not turned off, step S10103 is returned to, and the application execution platform 301 continues to execute the main program.

In this way, the application execution platform 301 monitors class generation and a power-off in the loop of step S10103 to step S10106 once activated. When a class is generated the class is loaded, and, when the power supply is turned off, power OFF processing is performed.

<Generation of Integrated Library and Processing for Deleting Individual Files>

Figure 10B:
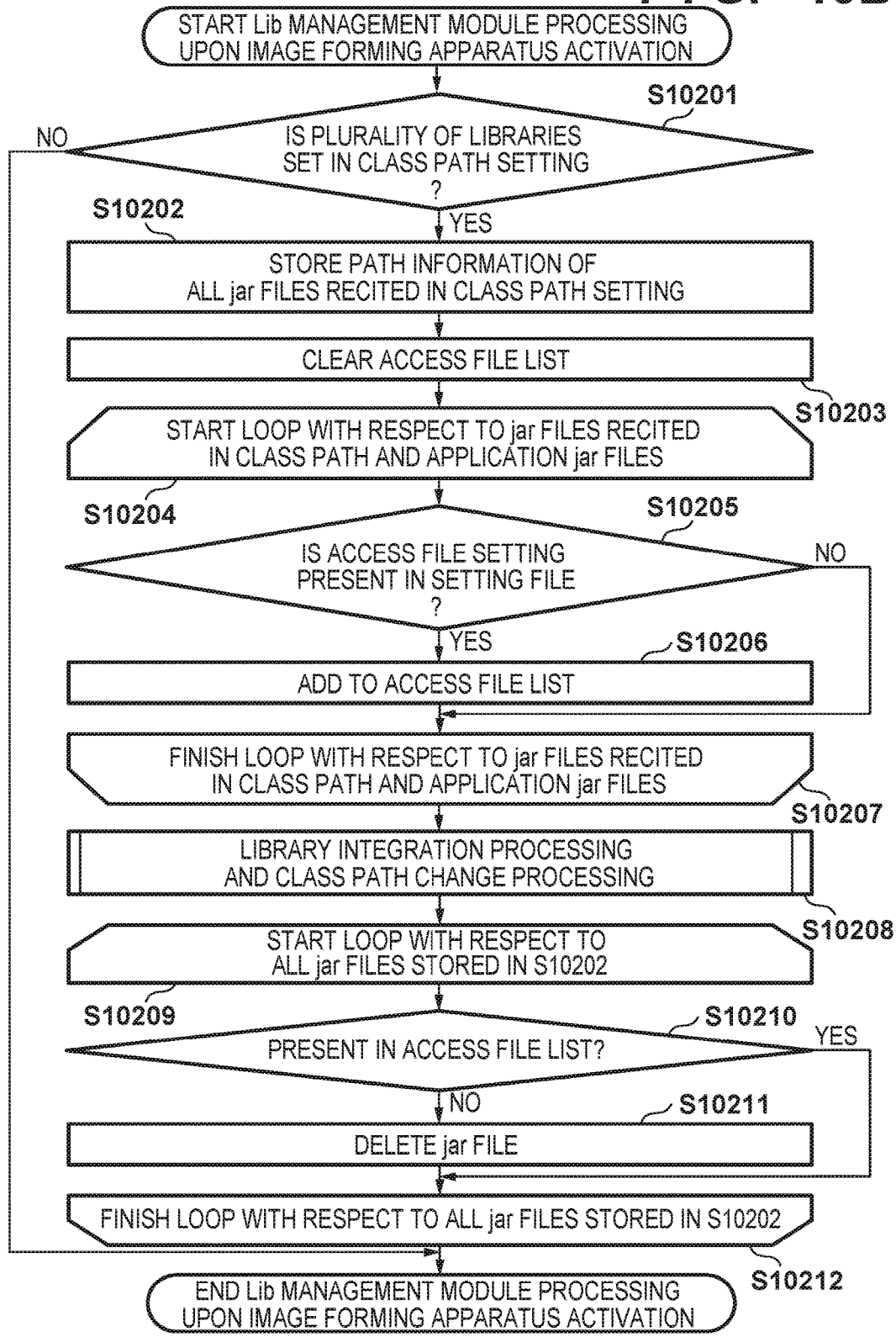
FIG. 10B is a flowchart illustrating a flow of processing of an image forming apparatus in the first embodiment.

FIG. 10B is a detailed flowchart of step S10101, and is a flowchart that illustrates a flow of processing of the Lib management module 304 when an instruction for integrated library generation processing is made to the startup module 300.

In step S10201, the Lib management module 304 determines whether a plurality of libraries are set in the first class path 402 and the second class path 514. If it is determined that one library is set, the Lib management module 304 terminates processing without performing integrated library generation processing. However, if it is determined that there is a plurality of libraries set, processing advances to step S10202.

In step S10202, the Lib management module 304 stores all libraries set in the first class path 402 and the second class path 514. Because this has the objective of referring to class path setting information before the change after the first class path 402 and the second class path 514 are changed, if it is possible to achieve this objective, configuration may be taken to store in memory or store in a separate file. When library information set in the class path is stored, the processing proceeds to step S10203.

In step S10203, the Lib management module 304 clears information registered in the access file list 306 to regenerate information of the access file list 306.

Next, in step S10204, the Lib management module 304 starts loop processing until step S10207, with respect to libraries recited in the first class path 402 and installed applications.

Next, in step S10205, the Lib management module 304 reads the configuration file 601 or the configuration file 502 and determines whether the direct access file setting 613 or 516 is respectively present in the configuration files. If it is determined that a direct access file setting is present, the processing proceeds to step S10206, and if it is determined to be not present the processing proceeds to step S10207.

In step S10206, the Lib management module 304 adds the information of the direct access file setting 613 to the access file list 306, and the processing advances to step S10207.

In step S10207, the Lib management module 304 determines whether loop processing has been executed with respect to all libraries and applications. If loop processing has not been executed with respect to all libraries and applications, the processing returns to step S10204, and if the loop processing has been executed with respect to all of these the processing proceeds to step S10208.

In step S10208, the Lib management module 304 performs library integration processing and class path change processing. Details of this processing is described later using FIG. 10C. When the Lib management module 304 finishes this processing, the processing advances to step S10209.

In step S10209 the Lib management module 304 starts loop processing for the processing until step S10212, with respect to libraries stored in step S10202.

In step S10210, the Lib management module 304 determines whether libraries corresponding to the access file list 306 are registered. If it is determined that they are registered the processing proceeds to step S10212, and if it is determined that they are not registered the processing proceeds to step S10211.

In step S10211, the Lib management module 304 deletes the corresponding library files, and the processing proceeds to step S10212.

In step S10212, the Lib management module 304 determines whether processing has been executed with respect to all libraries stored in step S10202. If processing has not been executed with respect to all libraries the processing returns to step S10209, and if processing has been executed with respect to all libraries, the loop is left and the processing of the Lib management module terminates.

In accordance with the above processing, it is possible to reduce the number of libraries and reduce resources such as file descriptors that are consumed, by integrating libraries described in the startup option configuration file 400 and the application configuration file 502 that are used at a time of activation and by applications. Furthermore, regarding class files that are accessed by an application or a library without going through the Lib management module 304, by leaving them and not deleting them and instead by deleting class files that do not correspond, it is possible to suppress consumption of resources such as storage or memory.

<Library Integration Processing and Class Path Change Processing>

Figure 10C:
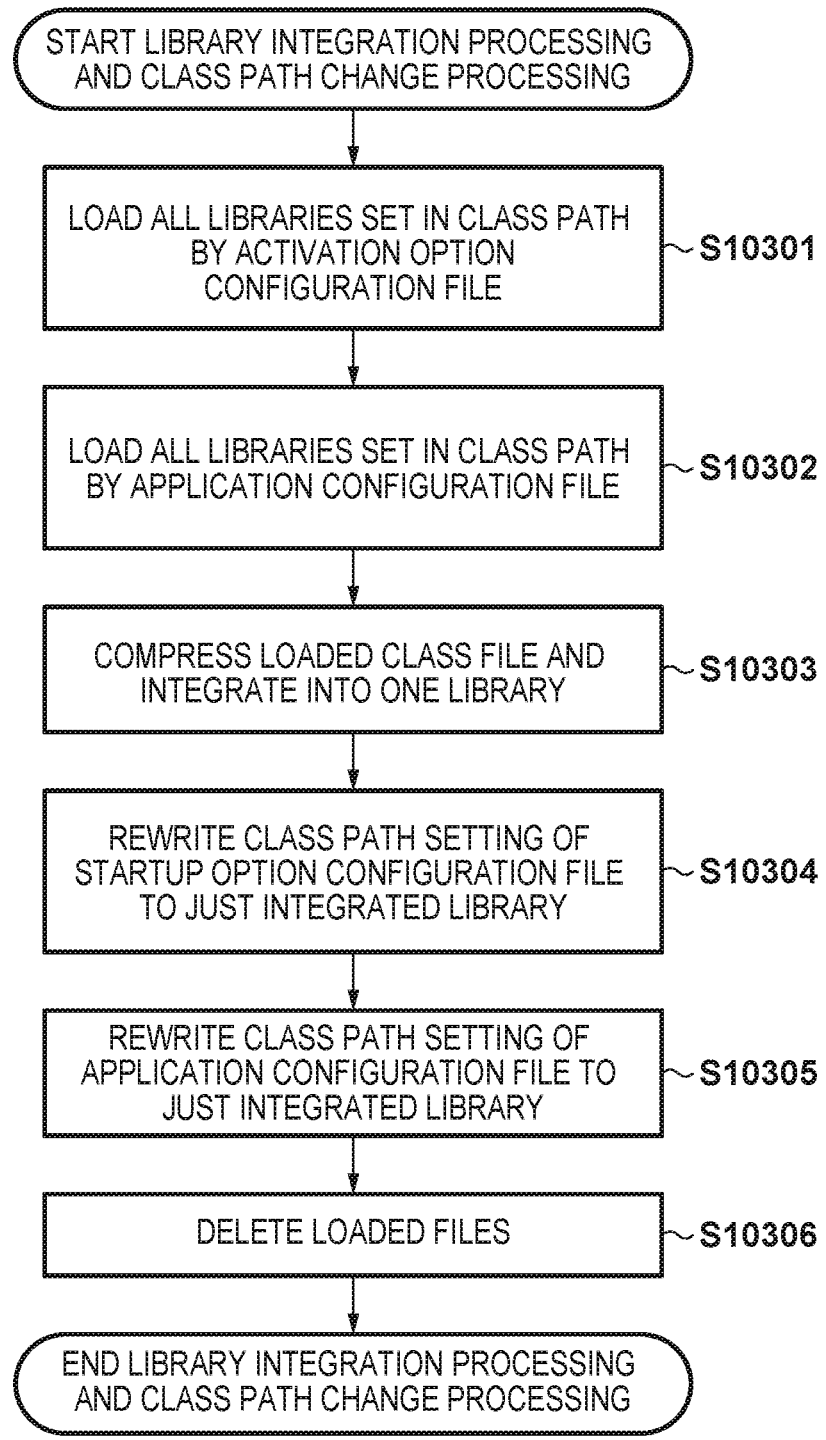
FIG. 10C is a flowchart illustrating a flow of processing of an image forming apparatus in the first embodiment.

FIG. 10C is a detailed flowchart of step S10208, and is a flowchart that illustrates a flow of processing in which the Lib management module 304 integrates library files and rewrites the class paths 402 and 514.

In step S10301, the Lib management module 304 reads the startup option configuration file 400, and expands all of the libraries 403 set in the first class path 402. At this point, the Lib management module 304 expands the libraries in an order from a library recited last in the recitation order. For example, in the case of the detail recited in FIG. 4A, the Lib management module 304 expands libraries in an order of libsystem004.jar (not shown), libsystem003.jar, libsystem002.jar, and libsystem001.jar. In this way, by expanding in an order from a library recited later, if the same class name happens to exist in the same name space and conflicts, it is possible to overwrite a class file expanded earlier by a class file expanded later—in other words by a class file recited earlier. Typically, if there is a conflict with the same name space and the same class name, the class file set first in the class path is loaded. Accordingly, if a conflict between classes occurs, by overwriting with the class file of a library recited earlier—in other words by a class file that is expanded later, it is possible to leave a class that should in fact be loaded in a typical environment.

Next the processing proceeds to step S10302, and the Lib management module 304 expands all of the application-contained libraries 501 set in the second class path 514 for installed applications. At this point, the Lib management module 304 expands the libraries in an order from a library recited last in the recitation order. When expanding processing for the application-contained libraries 501 finishes, the processing proceeds to step S10303. In step S10303, the Lib management module 304 compresses all of the class files expanded in step S10301 and step S10302 into one JAR file format as an integrated library (libinteg.jar here). The integrated library has a structure that integrates the libraries before integration into one tree structure as illustrated in FIG. 9B, for example. In other words, the libraries are integrated such that the relative class configuration in the libraries before integration is maintained in the library after integration. The class files may be stored in the same folder as the class files that were the target of the integration.

In step S10304, the Lib management module 304 adds the integrated library compressed and generated in step S10303 to a setting of the first class path 402, and deletes recitation of libraries other than the integrated library. By this, the startup option configuration file 400 is made to have recitation details like the startup option configuration file 410.

Next the processing proceeds to step S10305, and the Lib management module 304 deletes the setting of library files from the setting of the second class path 514. By this, the application configuration file 502 is made to have recitation details like the application configuration file 520. When the processing for deleting the setting of the second class path 514 completes, the processing proceeds to step S10306. In step S10306, the Lib management module 304 deletes the files expanded in step S10301 and step S10302, and terminates library integration processing and class path change processing.

By the above processing, the libraries described in the startup option configuration file 400 and the application configuration file are integrated.

<Processing by the Class Loader 302 at Time of Class Generation>

FIG. 10D is a detailed flowchart of step S10104, and is a flowchart that illustrates a flow of processing of the class loader 302 when a class is generated during execution of the main program.

In step S10401 the class loader 302 determines whether a class that has not been loaded by the main program which is currently executing has been executed. If the class has completed loaded, processing for class loading terminates, and the processing continues to advance to the processing of the main program. If the class has not been loaded, processing advances to step S10402. In step S10402 the class loader determines whether a library recited in the class path is open. If the library is open, the processing proceeds to step S10404, and if they are not open the processing proceeds to step S10403. In step S10403, the class loader 302 opens the library set in the first class path 411. At this point, the class loader 302 consumes one file descriptor because a file is opened. The processing proceeds to step S10404. In step S10404, the class loader 302 determines whether a class to be loaded is in the library. If the class to be loaded is found, in step S10405 the class loader 302 loads the class from the library, and class load processing terminates. If the class that is desired to be loaded is not found, in step S10406 the class loader 302 determines whether it has searched all libraries recited in the class path. If it is determined that all libraries have not been searched, the processing returns to step S10402, and the process for determining is performed for the next library. However, in the present embodiment because all library files are integrated into one, and only the integrated library is present in the first class path, the processing does not return to step S10402. Accordingly, because the file open processing in step S10403 is only performed once with respect to the integrated library, the number of file descriptors used regarding the class load is only one. In other words, even if the library files increase due to a function enhancement or the like, the number of file descriptors used do not increase.

Meanwhile if it is determined that all libraries have been searched in step S10406, the processing proceeds to step S10407. In step S10407 the class loader 302 returns an error indicating that the class was not found, and class load processing terminates.

Note that, because it is envisioned that a typical class loader is used in the present embodiment, the determination of step S10406 always has the same result (the determination that all libraries have been searched), and unnecessary processing for determining is performed. However the present invention is not limited to this configuration, and configuration may be taken to use a special class loader that omits the processing for determining of step S10406 (in other words directly advance processing from step S10404 to step S10407).

As explained above, in the first embodiment of the present invention, before activation of the application execution platform 301, for example at a time of activation of the image forming apparatus, the Lib management module 304 generates an integrated library, and only the integrated library is set to the first class path 411. As a result, because all class files are included in the integrated library, after the application execution platform 301 is activated, if the class loader searches for a class, the class loader 302 can find the class by searching only the integrated library. In other words, because there is only one library that the class loader 302 opens, it is possible to set the number of file descriptors used to one. Consequently, it is possible to set the number of file descriptors used for the class loader to open libraries to one, irrespective of the number of libraries set in the first class path 402 and the number of libraries set in the second class path 514.

In addition, it is possible to suppress a usage amount of storage by having a configuration in which library files before the integration are deleted after the integrated library is generated. In addition, at that time, configuration is such that a library file that is directly accessed without going through the class loader is left and not deleted. Therefore, even if there is processing that directly accesses the inside of a library file, operation is possible without causing an error to occur.

Note that, although there is a configuration in which the Lib management module performs integrated library generation processing or the like at the time of activation of the image forming apparatus in the present embodiment, there is no limitation to this configuration, and configuration may such that it is performed at a time of a firmware update.

Second Embodiment

Next the figures are used to give an explanation regarding a second embodiment of the present invention.

In the first embodiment all classes in the libraries set in the first class path 402 and the second class path 514 were compressed into one integrated library. In this configuration it is possible to significantly reduce the number of file descriptors used, but a usage amount of storage becomes larger if the number of library files that are directly accessed increases. Therefore, this may be a problem in a device having a small storage capacity. In the second embodiment, explanation is given of a configuration in which, when the Lib management module 304 integrates libraries, only libraries that are not directly accessed are integrated, and class loading is performed from individual library files for library files that are directly accessed.

In the second embodiment, explanation is omitted for FIG. 1, FIG. 2, FIG. 6A, FIG. 6B, FIG. 7, and FIG. 8 because they are common with the first embodiment, and only portions that have differences are explained below.

A configuration of the application execution environment for executing an application on the image forming apparatus 100 is similar to that of FIG. 3. However, processing in which the Lib management module 304 integrates libraries and changes class path settings is different. Specifically, control is performed to not integrate library files that are directly accessed when the Lib management module 304 integrates libraries. Therefore, when files other than for libraries that are directly accessed are deleted similarly to in the first embodiment, the total storage usage amount after the Lib management module 304 has performed processing does not change from before the library integration processing. Because of this it is possible to avoid a state in which storage becomes insufficient in a device having a small storage capacity.

<Example of Startup Option Configuration File>

FIG. 11 is a view that illustrates a startup option configuration file 1100 after it is changed by the Lib management module 304 in the present embodiment. Note that the startup option configuration file before the change is similar to that of FIG. 4A of the first embodiment. In FIG. 11, the startup option configuration file 1100 is a startup option configuration file after the Lib management module 304 generates an integrated library and changes the details of the file. The startup module 300 reads the detail of the startup option configuration file 400, and uses the read detail as an startup option of the application execution platform 301. Libraries 1101 is location information of libraries set in the first class path. After generating the integrated library, the Lib management module 304 adds a path of the integrated library to a class path setting of the startup option configuration file 400, and deletes libraries that are not present in the access file list. Here, because the integrated library is something that integrates libraries that are not present in the access file list, it becomes possible to use the same classes as before the integration in accordance with these setting details.

<Example of Application Configuration File>

FIG. 12 is a view illustrating an example of items recited in the application configuration file after the recitation of the libraries set in the second class path 514 is deleted by the Lib management module 304 in the second embodiment. Because the application configuration and the application configuration file 502 before deletion by the Lib management module 304 are similar to that in the first embodiment, explanation thereof is omitted.

When the startup module 300 makes an instruction to the Lib management module 304 for generation processing of the integrated library, the Lib management module 304 refers to the second class path 514 of the application configuration file 502 and the access file list. The application-contained library that is present in the second class path and is not present in the access file list is expanded. Subsequently, the Lib management module 304 integrates classes not present in the access file list from libraries set in the first class path 402, and re-compresses them as an integrated library in the JAR file format. Subsequently, the Lib management module 304 adds the newly generated integrated library to the first class path 402, and deletes the description of libraries not present in the access file list. The Lib management module 304 then deletes the recitation of libraries not present in the access file list out of libraries set in the second class path 514 of the application configuration file 502. Reference numeral 1200 indicates the application configuration file after the recitation of the libraries set in the second class path 514 is deleted. Reference numeral 1201 indicates the second class path, and setting of the path of the application executable code file 500 and the library present in the access file list are recited.

<Example of Class File Arrangement>

Figure 13A:
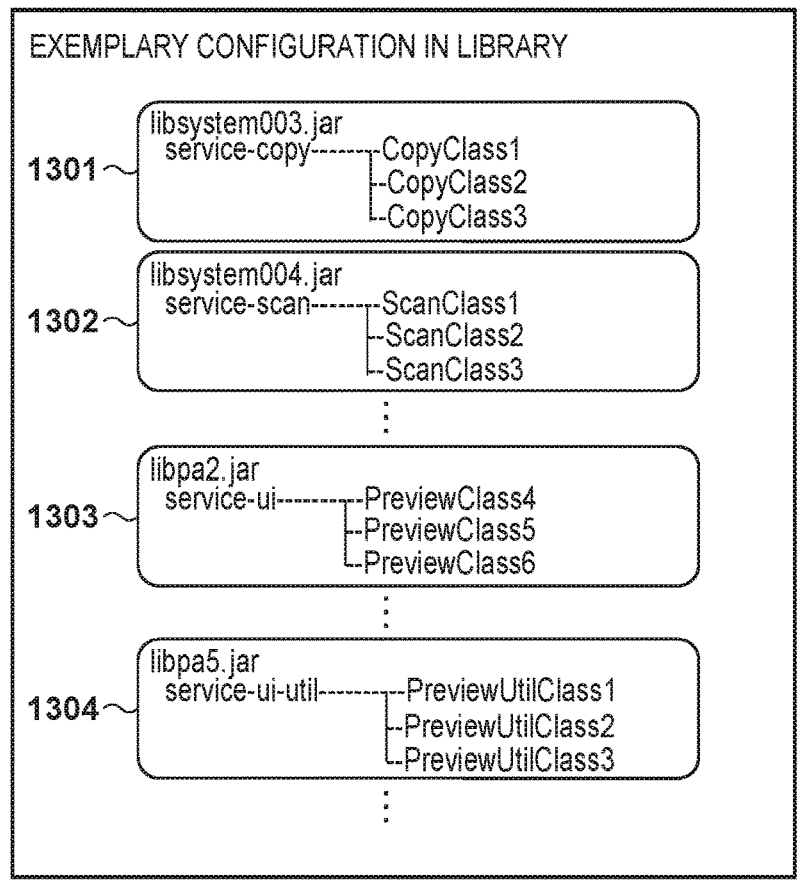
FIG. 13A and FIG. 13B are views illustrating arrangements of class files in a library in the second embodiment.
Figure 13B:
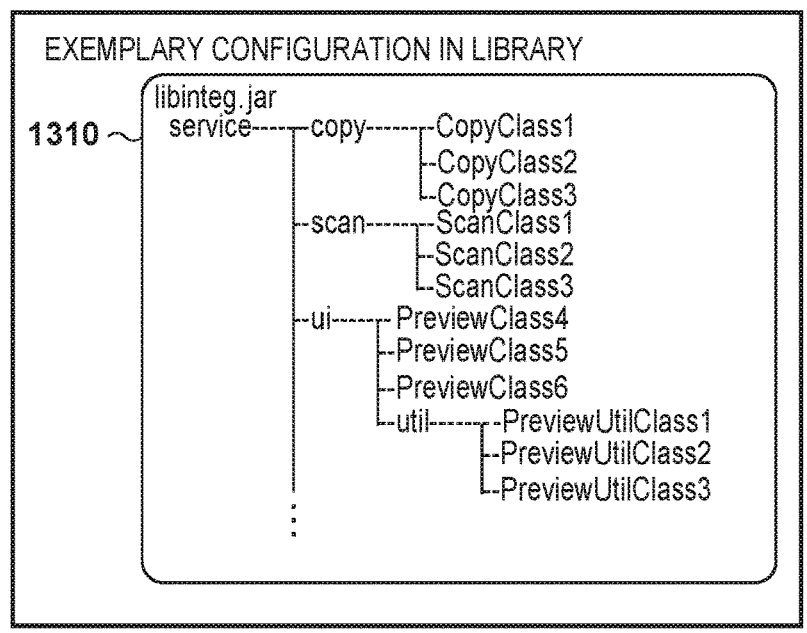

FIG. 13A and FIG. 13B are configuration diagrams that illustrate, by tree shapes, examples of arrangement of class files in libraries of the second embodiment.

FIG. 13A is a view that illustrates the inside of libraries that are expanded for the Lib management module 304 to gather and compresses class files. Trees 1301 to 1302 arrange class files in libraries not present in the access file list out of libraries set in the first class path 402. Trees 1303 to 1304 arrange class files in libraries not present in the access file list out of libraries set in the second class path 514.

FIG. 13B is a view that illustrates the internals of an integrated library generated after the Lib management module 304 expands the libraries and compresses all of the expanded class files. A tree 1310 is an arrangement of class files in an integrated library set in the first class path 411. In comparison with FIG. 9B, the class files of libsystem001.jar and libsystem002.jar which are files recorded in the access file list are not integrated. If focus is given to only the library arrangement, that of the present embodiment is common with that of the first embodiment, which is in FIG. 8. However, it differs from that of the first embodiment in a point that class files recited in the access file list are not included in the integrated library.

In this way, because the integrated library in the second embodiment has a configuration of integrating only libraries that are not directly accessed, the file size of the integrated library is smaller than that in the first embodiment. In addition, regarding libraries not included in the integrated library, because this is configuration in which the setting of libraries not integrated is left in the first class path and the second class path, classes necessary for execution of processing are not lacking.

<Library Integration Processing>

FIG. 14 is a detailed flowchart of step S10208 in the second embodiment, and is a flowchart that illustrates a flow of processing in which the Lib management module 304 integrates library files and rewrites the class paths 402 and 514. Note that, at step S10208, the access file list is already generated due to the loop of step S10204 to step S10207.

In step S14101, the Lib management module 304 reads the startup option configuration file 400, and expands libraries not registered in the access file list 306 out of the libraries 403 set in the first class path 402. At this point, the Lib management module 304 expands the libraries in an order from a library recited last in the recitation order. For example, if the first class path is the details of FIG. 4A and the access file list is the details of FIG. 7, the Lib management module 304 expands libraries in the order of libsystem004.jar and libsystem003.jar. In addition, libsystem001.jar and libsystem002.jar are not expanded because they are registered in the access file list. Next the processing proceeds to step S14102.

In step S14102, the Lib management module 304 reads the application configuration file 502 of the installed application, and out of the application-contained libraries 501 set in the second class path 514, expands libraries not registered in the access file list 306. At this point, the Lib management module 304 expands the libraries in an order from a library recited last in the recitation order. When expanding processing for the application-contained libraries 501 finishes, the processing proceeds to step S14103. In step S14103, the Lib management module 304 compresses all of the class files expanded in step S14101 and step S14102 into one JAR file format as an integrated library. As a result, an integrated library 1310 as illustrated in FIG. 13B for example is generated.

In step S14104, the Lib management module 304 adds the integrated library compressed and generated in step S14103 to the setting of the first class path 402 of the startup option configuration file 400, and deletes the setting of library files not registered in the access file list. By this, for example the startup option configuration file 400 is made to have recitation details like the startup option configuration file 1100 illustrated in FIG. 11.

Next the processing proceeds to step S14105, and the Lib management module 304 deletes the setting of library files not registered in the access file list from the setting of the second class path 514 of the application configuration file 502. By this, for example the application configuration file 502 is made to have recitation details as in an application configuration file 1200 illustrated in FIG. 12. When the processing for deleting the setting of the second class path 514 completes, the processing proceeds to step S14106.

In step S14106, the Lib management module 304 deletes the files expanded in step S14101 and step S14102, and terminates library integration processing and class path change processing.

As explained above, in the second embodiment of the present invention, when integrating libraries set in the class path, the Lib management module 304 performs integration by targeting only libraries that are not directly accessed. Therefore, the file size of the integrated library is smaller than that in the first embodiment by a portion in which files that are directly accessed do not overlap with the integrated library. Because of this it is possible suppresses a storage usage amount after the processing completion of the Lib management module to be similar to that before the processing.

In addition, for libraries that are directly accessed, configuration is such that the setting thereof is left in the class path, and classes thereof are loaded from individual libraries. Therefore, a file descriptor is consumed when the class loader 302 opens a library out of these libraries, and a number of file descriptors used is greater than in the first embodiment. However, because it is possible to reduce the number of file descriptors used by just the number of libraries collected in the integrated library, it is possible to achieve a reduction of the number of file descriptors without causing a storage deficiency to occur even in a device having a small storage capacity.

Third Embodiment

Next the figures are used to give an explanation regarding a third embodiment of the present invention. While the first embodiment is able to significantly reduce file descriptors used, if a library having a large file size is direct accessed, the usage amount of storage become large. In contrast, while the second embodiment can suppress the usage amount of storage, if a large number of libraries having a small file size are directly accessed, it is not possible to reduce the number of file descriptors that are consumed. In the third embodiment, explanation is given of an example in which processing is divided between the method of the first embodiment and the method of the second embodiment, in accordance with the situation.

Figure 15A:
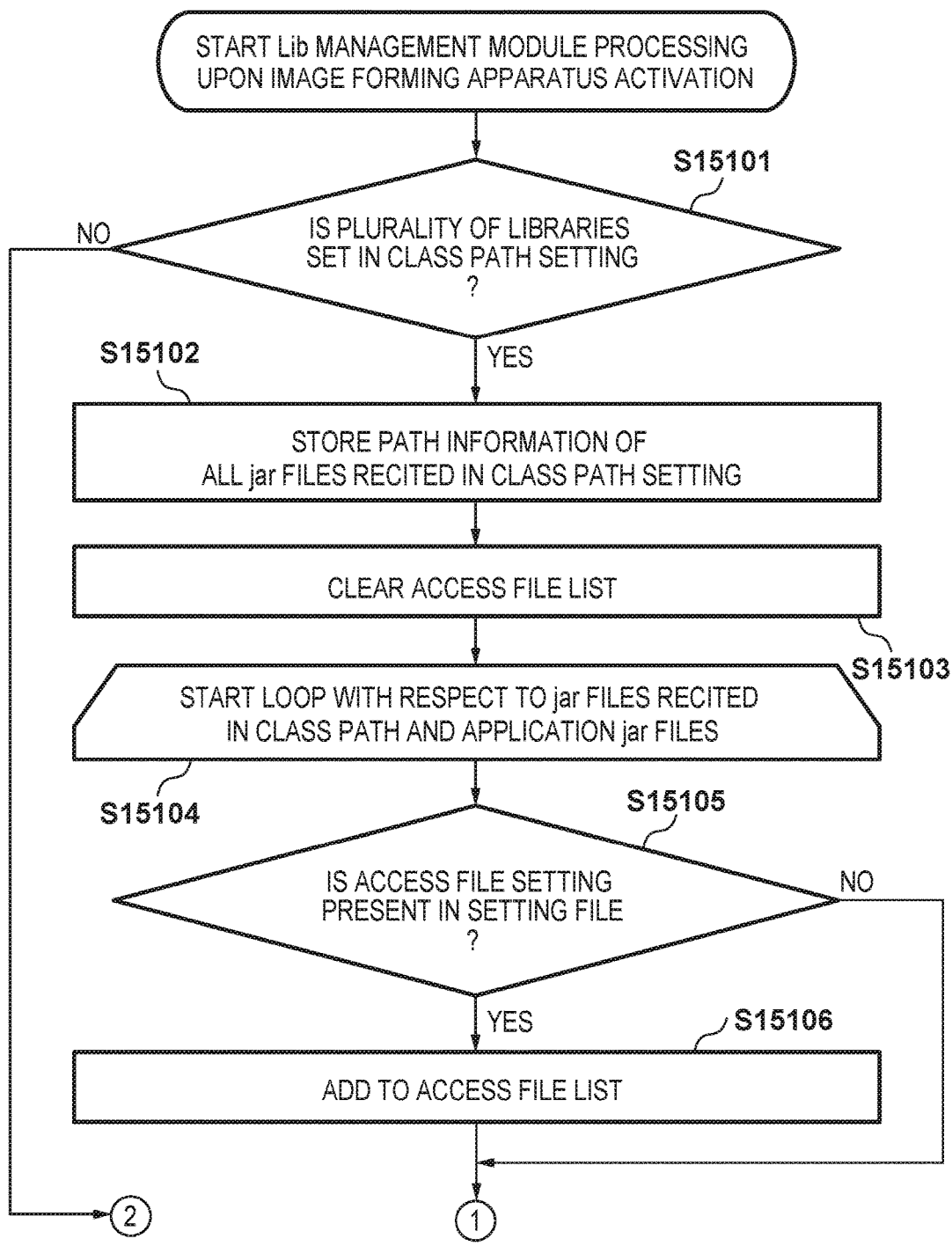

In the third embodiment, because it is common with the details explained in the first embodiment and the second embodiment in regards to figures other than FIG. 10B, explanation thereof is omitted, and only differences are explained. FIGS. 15A and 15B are the details of the processing of step S10101 of FIG. 10A in the present embodiment, and is a flowchart that illustrates the flow of processing of the Lib management module 304 when an instruction for integrated library generation processing is made to the startup module 300. In other words, in the present embodiment, FIGS. 15A and 15B is executed in place of FIG. 10B in the first embodiment.

In step S15101, the Lib management module 304 determines whether a plurality of libraries are set in the first class path 402 and the second class path 514. If it is determined that one library is set, the Lib management module 304 terminates processing without performing integrated library generation processing. However, if it is determined that there is a plurality of libraries set, processing advances to step S15102.

In step S15102, the Lib management module 304 stores all libraries set in the first class path 402 and the second class path 514. This is something with the objective of referring to setting information of the class paths before the change after the first class path 402 and the second class path 514 are changed, and so if this objective can be achieved, configuration may be taken to store it in another file or store it in memory. When library information set in the class path is stored, the processing proceeds to step S15103.

In step S15103, the Lib management module 304 clears information registered in the access file list 306 to regenerate information of the access file list 306.

Next, in step S15104, the Lib management module 304 starts loop processing until step S15107, with respect to libraries recited in the first class path 402 and installed applications.

Next, in step S15105, the Lib management module 304 reads the configuration file 601 or the configuration file 502 and determines whether the direct access file setting 613 or 516 is respectively present in the configuration files. If it is determined that a direct access file setting is present, the processing proceeds to step S15106, and if it is determined to be not present the processing proceeds to step S15107.

In step S15106, the Lib management module 304 adds the information of the direct access file setting 613 to the access file list 306, and the processing advances to step S15107.

In step S15107, the Lib management module 304 determines whether loop processing has been executed with respect to all libraries and applications. If loop processing has not been executed with respect to all libraries and applications, the processing returns to step S15104, and if the loop processing has been executed with respect to all of these the processing proceeds to step S15108.

In step S15108, the Lib management module 304 calculates the total file size of the library files registered in the access file list, and the processing proceeds to S15109.

In S15109, the Lib management module 304 determines whether the total file size calculated in step S15108 is greater than or equal to a predetermined size. If it is determined to be greater than or equal to the predetermined size in S15109, the processing proceeds to step S15111, and if it is determined to be less than the predetermined size the processing proceeds to step S15110. Here, in order to simplify the explanation, although this is a flowchart in which a comparison is made by a fixed threshold, for example, the threshold may be determined dynamically after obtaining the available space of the image forming apparatus.

In step S15110, the Lib management module 304 performs library integration processing and class path change processing in accordance with the processing of FIG. 10C, and the processing proceeds to step S15112. In other words, as in the first embodiment, the libraries described in the startup option configuration file 400 and the application configuration file 502 are integrated.

In step S15111, the Lib management module 304 performs library integration processing and class path change processing in accordance with the processing of FIG. 14, and the processing proceeds to step S15112. In other words, as in the second embodiment, out of libraries described in the startup option configuration file 400 and the application configuration file 502, only those that are not directly accessed are integrated.

In step S15112 the Lib management module 304 starts loop processing for the processing until step S15115, with respect to libraries stored in step S15102.

In step S15113, the Lib management module 304 determines whether libraries corresponding to the access file list 306 are registered. If it is determined that they are registered the processing proceeds to step S15115, and if it is determined that they are not registered the processing proceeds to step S15114.

In step S15114, the Lib management module 304 deletes the corresponding library files, and the processing proceeds to step S15115.

In step S15115, the Lib management module 304 determines whether processing has been executed with respect to all libraries stored in step S15102. If processing has not been executed with respect to all libraries the processing returns to step S15112, and if processing has been executed with respect to all libraries, the loop is left and the processing of the Lib management module terminates.

As explained above, in the third embodiment of the present invention, configuration is such that processing details for library integration and class path changing is switched in accordance with a total file size of libraries that are directly accessed. Because of this, because the method of the first embodiment is adopted in a situation where the total file size of libraries that are directly access is less than or equal to a threshold, it is possible to suppress the number of file descriptors used to a minimum while suppressing a storage usage amount. In addition, because the method of the second embodiment is adopted in a situation where the total file size of libraries that are directly accessed is greater than a threshold, it is possible to suppress a storage usage amount to a minimum while suppressing the usage amount of file descriptors. Because an appropriate method is adopted in accordance with a situation of a storage capacity in this way, it becomes easier to reduce a number of file descriptors used even for a device having a small storage capacity.

[Variation]

In the third embodiment, in S15109 the total file size of libraries directly accessed is compared with a threshold, and, in accordance with the result thereof, whether to integrate libraries that are directly accessed is determined. In contrast to this, configuration may be taken such that prioritization of which consumption amount to suppress—either file descriptors or storage—is caused to be specified by an administrator for example, and the basis of the determination is changed in accordance with that specification. In such a case step S15108 of FIG. 15B is unnecessary, and in S15109 a resource to prioritize is determined and if file descriptors are prioritized the processing branches to step S15110, and otherwise, in other words when prioritizing storage capacity, the processing branches to step S15111.

Alternatively, comparison is made in S15109 between a number of files recited in the access file list and a predetermined threshold (for example, a value obtained by subtracting 1 which is the number of integrated libraries from the upper limit value of file descriptors), and causing processing to be branched in accordance with the result thereof. For example configuration may be taken such that, if the number of files recited in the access file list is less than or equal to the threshold the processing branches to step S15111, and if the threshold is exceeded branch to step S15110. In addition, configuration may be such that, if the number of files recited in the access file list exceeds the threshold, some of the files recited in the access file list are integrated into the integrated library, and the remainder are not integrated. By doing so, it is possible to achieve both suppression of a consumption amount of file descriptors and suppression of consumption of storage.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-041492, filed Mar. 3, 2016 which is hereby incorporated by reference herein in its entirety.

What is claimed is:

1. An information processing apparatus, comprising:
at least one processor; and
at least one memory storing instructions that, when executed, cause the at least one processor to function as
a loading unit that, when an installed program is executed, opens a library that contains a class used by the program and loads the class, the loading unit consuming resources of an amount in accordance with a number of opened libraries;
a determination unit that determines if a number of libraries that include a class set for the installed program is plural;
an integration unit that, if it is determined that the number of libraries is plural, integrates at least some classes included in the libraries into a smaller number of integrated libraries; and
a deletion unit that deletes pre-integration libraries that include the classes included in the integrated libraries, without deleting libraries that are designated to be accessed without using the loading unit.

2. The information processing apparatus according to claim 1, wherein
the integration unit integrates all of the classes included in the libraries into the integrated libraries.

3. The information processing apparatus according to claim 1, wherein
the integration unit integrates into the integrated libraries only classes included in libraries other than the libraries that are designated to be accessed without using the loading unit.

4. The information processing apparatus according to claim 1, wherein
if a storage capacity that totals the libraries accessed without using the loading unit is greater than a predetermined threshold, the integration unit integrates in the integrated libraries only classes included in libraries other than the libraries designated to be accessed without using the loading unit, and if the storage capacity is less than or equal to the predetermined threshold, the integration unit integrates in the integrated libraries all of the classes included in all the pre-integration libraries.

5. The information processing apparatus according to claim 1, wherein
the integration unit, if the number of the libraries accessed without using the loading unit is greater than a predetermined threshold, integrates in the integrated libraries only classes included in libraries other than the libraries designated to be accessed without using the loading unit, and if the number of the libraries accessed without using the loading unit is less than or equal to the predetermined threshold, integrates into the integrated libraries all of the classes included in all the pre-integration libraries.

6. The information processing apparatus according to claim 1, wherein
the libraries are files in which one or more classes are compressed; and
the integration unit, if the determination unit determines that the number of libraries that include a class set for the installed program is plural, expands the pre-integration libraries, and compresses and integrates the libraries into a number of integrated libraries that is smaller than the number of pre-integration libraries.

7. The information processing apparatus according to claim 1, wherein
the integration unit integrates the libraries when the information processing apparatus is activated.

8. The information processing apparatus according to claim 1, wherein
the integration unit integrates the libraries when an application is installed as the program.

9. The information processing apparatus according to claim 1, wherein
the determination unit refers to a class path that indicates the location of classes and is described in a configuration file of the installed program to specify the libraries that include a class set for the program.

10. The information processing apparatus according to claim 1, wherein
the integration unit integrates all of the classes included in the libraries into one library.

11. The information processing apparatus according to claim 1, wherein
the integration unit integrates the libraries by generating a library that includes the classes to integrate.

12. The information processing apparatus according to claim 1, wherein
the integration unit integrates the libraries such that a relative class configuration in the libraries before integration is maintained in the library after integration.

13. The information processing apparatus according to claim 1, wherein a file descriptor is included in the resources.

14. A library management method for an information processing apparatus having loading unit for, when an installed program is executed, opening a library that includes a class used by the program and loading the class, the loading unit consuming resources of an amount that is in accordance with a number of opened libraries, the method comprising:
determining whether if a number of libraries that include a class set for the installed program is plural;
integrating classes included in the libraries in a number of integrated libraries that is fewer than the number of libraries if it is determined that the number of libraries is plural; and
deleting the pre-integration libraries that include the classes included in the integrated libraries excluding libraries that are accessed without going through the loading unit.

15. The library management method according to claim 14, wherein
the libraries are files in which one or more classes are compressed, and
the integrating, if the number of libraries is determined to be plural, expands the libraries, and compresses and integrates into a number of integrated libraries smaller than the number of libraries.

16. A non-transitory computer-readable storage medium storing a program for causing a computer to function as
a loading unit configured to, when an installed program is executed, open a library that contains a class used by the program and load the class, the loading unit consuming resources of an amount in accordance with a number of opened libraries;
a determination unit configured to determine whether if a number of libraries that include a class set for the installed program is plural;
an integration unit configured to integrate classes included in the libraries in a number of integrated libraries that is fewer than the number of libraries if it is determined that the number of libraries is plural; and
a deletion unit configured to delete the pre-integration libraries that include the classes included in the integrated libraries excluding libraries that are accessed without going through the loading unit.

17. The non-transitory computer-readable storage medium according to claim 16, wherein
the libraries are files in which one or more classes are compressed, and
the integration unit, if the number of libraries is determined to be plural by the determination unit, expands the libraries, and compresses and integrates into a number of integrated libraries smaller than the number of libraries.

* * * * *